No. 707,700. Patented Aug. 26, 1902.
J. JACOBS.
APPLE PARER.
(Application filed June 14, 1901.)
(No Model.) 2 Sheets—Sheet 1.
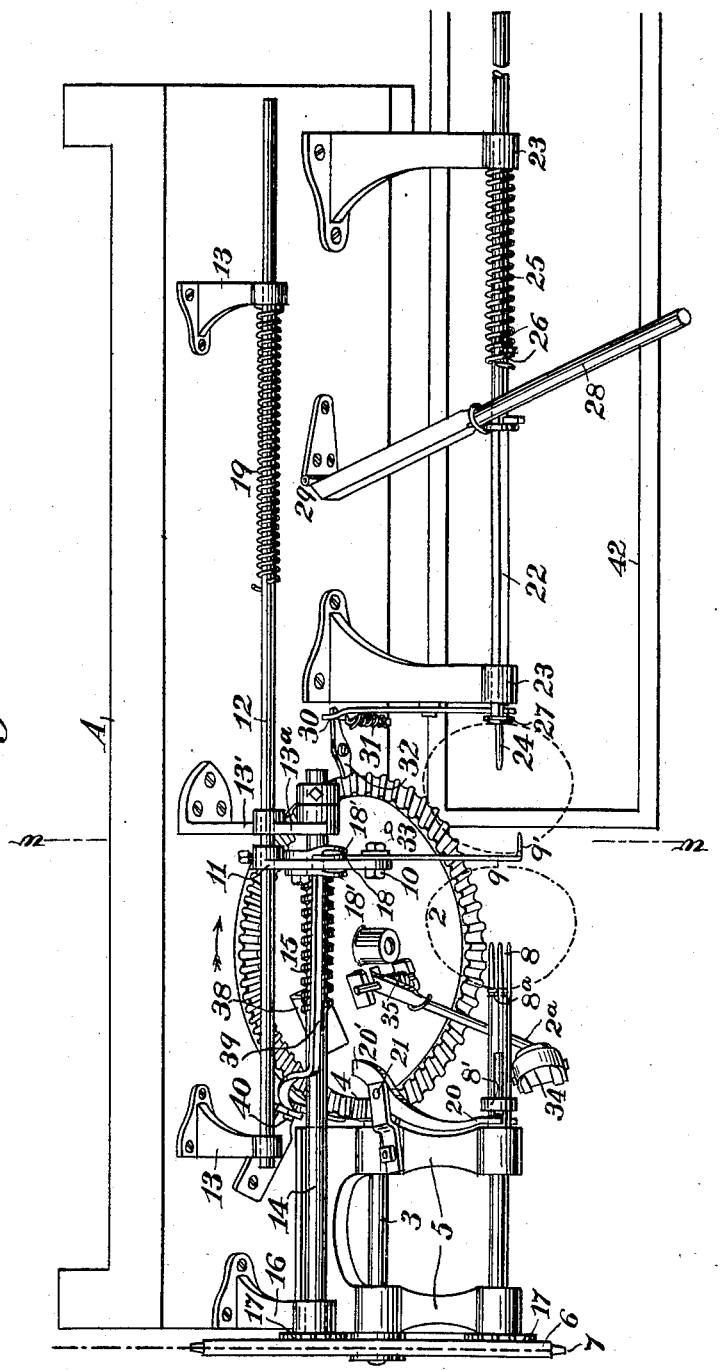
Witnesses,
E. A. Brandau
G. A. Amrse
Inventor
John Jacobs
By Durry Strong & Co
atty

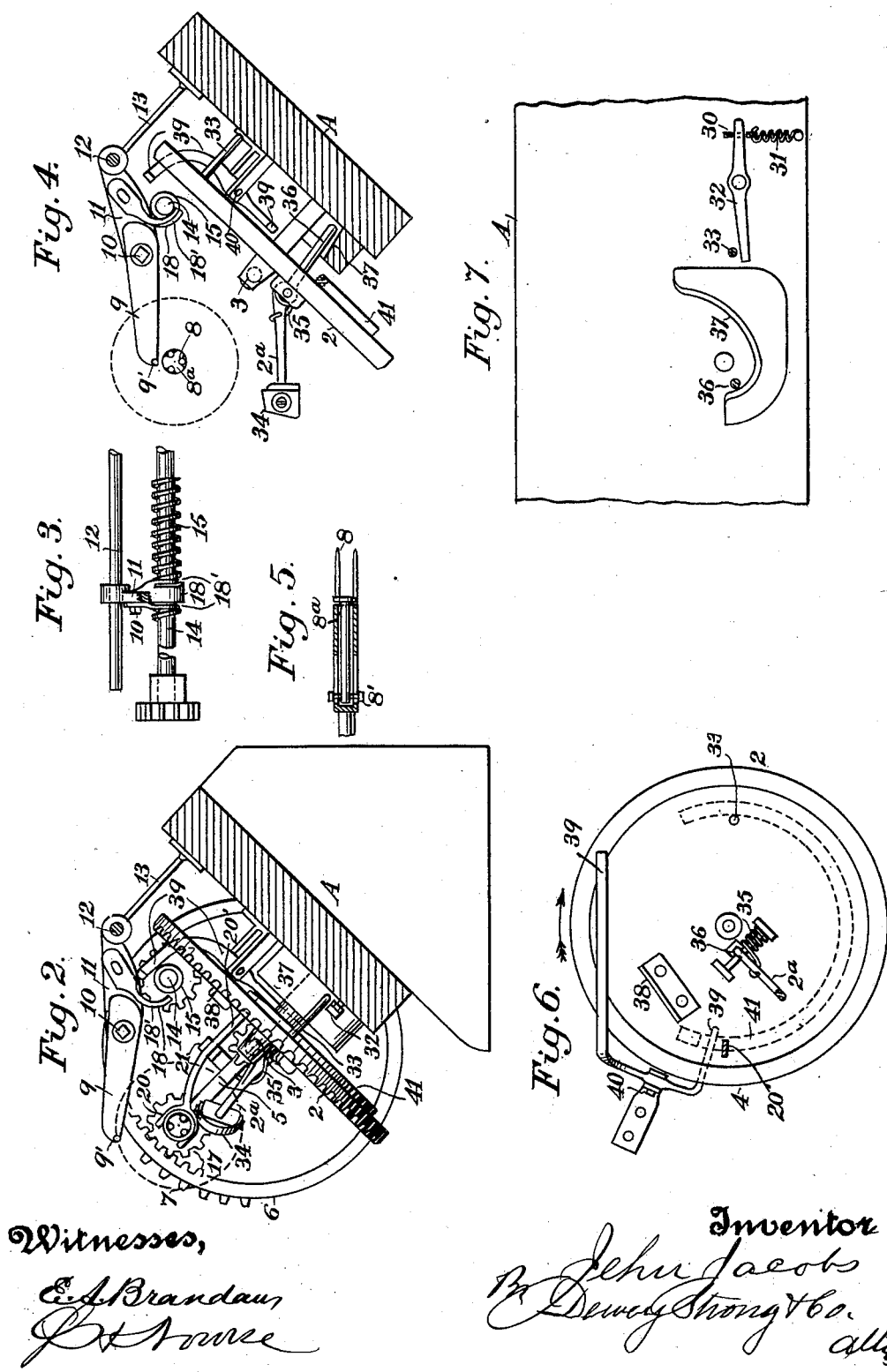

UNITED STATES PATENT OFFICE.

JEHU JACOBS, OF HENLEY, CALIFORNIA.

APPLE-PARER.

SPECIFICATION forming part of Letters Patent No. 707,700, dated August 26, 1902.

Application filed June 14, 1901. Serial No. 64,551. (No model.)

*To all whom it may concern:*

Be it known that I, JEHU JACOBS, a citizen of the United States, residing at Henley, county of Siskiyou, State of California, have invented an Improvement in a Combined Apple Parer, Corer, and Slicer; and I hereby declare the following to be a full, clear, and exact description of the same.

My invention relates to improvements in machines by which the fruit is pared, cored, and sliced at one operation.

It consists of the parts and the constructions and combinations of parts hereinafter described and claimed.

Having reference to the accompanying drawings, Figure 1 is a plan of my invention upon its inclined support. Fig. 2 is a part transverse section and elevation on the line *w w* of Fig. 1. Fig. 3 is a plan showing the fingers of the slicing and coring knife in engagement with the worm. Fig. 4 is a similar view to Fig. 2, illustrating the action of the slicing and coring knife. Fig. 5 is a longitudinal section through the fork 8. Fig. 6 is a plan of the turn-table. Fig. 7 is a plan showing the semicircular cam underneath the turn-table.

A represents a suitable base upon which the parts of my machine are supported.

2 is a turn-table carrying the parer $2^a$ and suitably driven from the shaft 3 by means of the gearing 4. The shaft 3 is supported in the bracket 5 and carries on its outer end the driving-wheel 6. This wheel may be operated by means of a crank, or it may be provided with sprocket-teeth 7 and driven from a foot or other motor. In the bracket 5 is also journaled the shaft of the fork 8, upon which the fruit is impinged and held during the process of paring, coring, and slicing. This fork is hollowed for a portion of its length adjacent to the tines, and in the hollow portion a plunger $8^a$ is slidable. A collar 8' surrounds the fork and connects by a pin with the plunger. A forked lever 20, fulcrumed at 21, bears against said collar, and by an oscillation of the lever the plunger is moved to eject the fruit from the tines. The movement of this lever is effected by means of a cam 38 upon the turn-table engaging an arm 20' of the lever. The fork is revolved by a pinion engaging the internal gear 17 on the driving-wheel 6. An apple is placed upon the tines by means of a sliding bar 22, supported in standards 23. This bar is in axial alinement with the fork 8 and has a spearpoint 24, upon which the fruit is placed by the operator. From this stage on the operation of impinging the apple on the fork-tines, the paring, coring, slicing, and final ejectment of the apple from the tines is entirely automatic. A helical spring 25 surrounds the bar and bears with one end against one of the standards 23 and has its other end secured to the bar, as by a pin placed in one or the other of the holes 26, whereby the compression of the spring may be regulated as desired. A notch 27 is provided in the bar 22, and when this bar is moved to compress the spring by means of the lever 28, which latter is fulcrumed, as at 29, a trigger 30 is adapted to engage said notch and hold the bar in this set position. This engagement is insured by means of the spring 31. A lever 32 engages with the trigger, and a projection 33 on the under side of the turn-table is adapted during the course of the revolution of the latter to trip said lever, pull the trigger, and allow the bar to spring forward, carrying the apple with it and securely placing it on the fork.

The parer $2^a$ is provided with an adjustable U-shaped knife 34, and this knife is held against the apple by means of a spring 35. As the turn-table revolves in the direction of the hands of a clock this knife 34 removes the skin of the apple in the usual manner. This is done during a semirevolution of the turn-table. Having pared the apple, a projection 36, Fig. 7, of the parer below the turn-table engages a semicircular cam 37, which acts to depress the parer during the remainder of its travel, so as as to move it out of contact with the pared apple and out of the way of the apple to be carried forward by the carrier-bar 22 and also to permit the parer to pass beneath the fork 8 into position again.

The slicing and coring are done by means of a knife 9, which is provided with a horizontally-projecting portion 9'. This knife is adjustably secured, by means of the set-bolt 10, to the handle or arm 11, carried on the slidable and rotatable shaft 12. This shaft is supported in standards 13 and 13'. Parallel with the shaft 12 is a second shaft 14, having a worm 15. This second shaft is journaled at one end in a projection 13$^a$ of the standard 13' and at the other end in a standard 16 and is driven, like the fork 8, by means of the internal gear 17 on the driving-wheel 6. On the under side of the knife-handle 11 is secured a three-fingered guide 18, which is adapted to engage the worm 15 when the knife is released by an arm 39. This arm is fulcrumed at 40 and has an extension which is engaged by a segmental cam 41 on the under side of the turn-table. During the engagement with this cam, which corresponds to the period of paring, the knife is supported on the arm 39 out of contact with the apple. The moment the paring is completed the arm 39 drops and allows the knife to come down upon the apple. As the knife drops the fingers 18' of the guide are adapted to engage the worm 15 and advance the knife toward the head of the machine. The fingers are so curved as to prevent the knife being raised during the engagement with the worm, but permit of the knife being moved freely vertically when out of such engagements. The knife has a twofold direction of cut. By reason of the travel of the knife on the worm and the revolution of the apple the blade 9 makes a vertical incision running spirally through the apple. At the same instant the projection 9' makes a horizontal cylindrical cut, which severs the core from the meat of the apple. A helical spring 19, secured to the shaft 12 and also to one of the standards 13, tends to rotate the shaft 12 so as always to press the knife downward against the arm 39 or worm-shaft 14, as the case may be, and at the same time serves to retract the shaft 12 and carry the knife back again against the standard 13' when the fingers have been released from engagement with the worm.

By means of the driving-wheel 6 and its internal gear mechanism operating the fork and turn-table and by the arrangement of cams the action of the carrier-bar, the fork, parer, the slicing and coring knife, and the ejecting-plunger is properly regulated.

In operation the lever 28 is thrown to compress the spring 25 and engage the trigger 30. An apple is placed upon the spear-point 24 after the parer has begun its return to the head of the machine and while its projection 36 is in engagement with the cam 37. The revolution of the turn-table or carriage 2 causes the pin 33 to trip the lever 32, pull the trigger, and allow the carrier-bar to shoot forward and causing the apple to be impinged upon the tines of the fork 8. At that moment the parer has passed beneath the fork. It then leaves the cam 37 and springs up against the apple, and during the half-revolution that it travels toward the rear of the machine the apple is peeled. Meanwhile the operator by a simple movement of the lever 28 has set the carrier-bar ready to receive the next apple. Simultaneous with the completion of the paring the projection 36 engages the cam 37, causing the parer to be pressed back and away from the apple, and the arm 39 leaves the cam 41, allowing the slicing and coring knife to drop, whereupon the fingers 18' immediately engage the worm 15. This causes the knife 9 to move toward the head of the machine, slicing and coring the apple, as before described. Meanwhile the operator has placed another apple in readiness upon the spear-point 24. The knife having traveled the length of the worm, which is sufficient to allow the operation of slicing and coring to be completed, the cam 41 reëngages the arm 39, raises the knife, and the spring 19 causes the bar 12 to retract, carrying the knife back again into position and in readiness for the next apple. As the knife is raised by the arm the forked lever 20 engages the cam 38, and the apple thus pared, sliced, and cored is thrown from the fork by means of the plunger 8$^a$. An instant later the pin 33 releases the trigger 30, another apple is placed on the fork, and the operation proceeds as before.

The base A is preferably inclined, as shown, so that the parings are thrown outward from the machine and away from the operator, while the fruit is more readily discharged into the trough 42. The parings and the finished fruit are accordingly delivered separate from each other.

Having thus described my invention, what I claim as new, and desire to secure by Letters Patent, is—

1. In a machine of the character described, the combination of a revoluble carriage and means for operating the same, a fork upon which an apple is capable of being held and revolved, a normally retracted, spring-pressed member axially in line with the fork and slidable in relation to the fork, a lever fulcrumed between its ends and having one end to engage said slidable member and a cam on the carriage adapted to engage the other end of said lever thereby oscillating the lever to cause the slidable member to eject the apple from the fork.

2. In a machine of the character described the combination with a revoluble carriage, a fork and means for rotating the same, and a paring mechanism, of a spring-pressed sliding bar disposed in line with the fork and having a point upon which the fruit is placed, means for retracting the bar and holding it in its retracted position, and a trigger mechanism actuated by the carriage to release the bar and allow the latter to place the fruit upon the fork.

3. In a machine of the character described the combination in a single organism of a normally retracted spring-pressed means for positioning the fruit; axially in line with fruit-holding devices; means for releasing the fruit-positioning devices to enable the latter to transfer the fruit to holding devices; means for holding and paring the fruit; a coring mechanism, means for slicing the fruit; means for ejecting the fruit; a revoluble carriage and connections for operating the paring and slicing mechanism; and a single power-wheel in operative connection with the carriage, the fruit-holding device and coring mechanism.

4. In a paring, coring and slicing machine the combination of a revoluble fork, an axially-alined carrier-bar by which the apple is placed upon said fork, means by which said bar is retracted, a trigger mechanism whereby said bar is held in such retracted position, a revoluble table having a part to contact with said trigger by which said trigger is released and the apple driven upon the fork, and a single power mechanism for rotating the fork and table and effecting the release of the carrier-bar.

5. In a parer, corer and slicer, the combination of a revoluble fork, an axially-alined carrier-bar upon which the apple is first impinged, a spring in conjunction with said bar, a lever by which said bar is retracted and the spring compressed, a trigger mechanism by which said bar is held in such retracted position, a revoluble member for releasing said trigger whereby the apple is driven upon the fork, a single power mechanism for operating the fork and revoluble member, and means for removing the apple from the fork.

6. In a parer, corer and slicer, the combination with a fork and a means including a normally retracted, spring-actuated bar disposed in line with the fork for automatically placing the fruit upon said fork, of a revoluble carriage, and connections between the same and the bar whereby said bar is automatically released during the revolution of the carriage, a parer thereon, said parer having a projection beneath the carriage and a semicircular cam with which said projection is adapted to engage whereby the parer is held out of contact with the apple after the process of paring is complete, and a single power mechanism for operating the fork, carriage and parer.

7. In a parer, corer and slicer, the combination of a fork, a turn-table, a parer thereon, a vertically-disposed knife having a horizontal projecting portion, means including a worm-shaft and devices carried by the knife and engaging said shaft, for advancing said knife periodically toward the head of the machine whereby the apple or like fruit is simultaneously sliced and cored, said horizontal portion of the knife capable of severing the core from the sliced fruit and means by which said fork, turn-table and knife are operated in unison.

8. In an apple parer, corer and slicer, the combination of a slidable and rotatable shaft, a knife secured thereon a second shaft parallel with the first shaft, a worm-gear on said second shaft, means by which the latter is revolved, and a fingered guide on said knife, said guide adapted to engage said worm whereby the knife is made to travel horizontally.

9. In a combined parer, corer and slicer, a turn-table, a parer thereon, means for holding an apple in relation to said parer, a slicing and coring knife turnable in a plane at right angles to the axis of the machine and movable in the line of direction of said axis, a second shaft having a worm thereon, a lever-arm by which said knife is held in a raised position during a portion of the revolution of the turn-table, and means by which said arm is released to allow said knife to fall, and means carried by the knife and adapted to engage said worm whereby the knife is advanced horizontally.

10. In a combined parer, corer and slicer, a turn-table, a parer thereon, means for holding an apple or the like in relation to said parer, a rotatable and slidable shaft, a knife thereon, a horizontal projecting cutting portion on said knife, a second shaft in relation to the first shaft, a worm on said second shaft, a lever-arm by which said knife is periodically held out of contact with said worm, means by which said arm is released to allow said knife to fall, means by which said knife is advanced upon said worm, and means whereby the first shaft and knife are retracted at the completion of the slicing and coring operation.

11. An apple paring, slicing and coring machine, consisting in the combination of an inclined support, a turn-table, a hollow fork upon which the apple to be pared, sliced and cored is held, a plunger operating in said fork, means including a normally retracted spring-pressed bar in line with the fork for automatically delivering the apple upon said fork, means for holding the bar retracted said means automatically releasing said bar by the revolution of the turn-table, a parer on said turn-table, a vertically and horizontally operating knife whereby the apple is sliced and simultaneously cored, and means for operating the plunger whereby the pared, sliced and cored fruit is ejected from the fork, and a single power mechanism for rotating the turn-table, fork and setting in operation the knife, the delivering means and the ejector.

In witness whereof I have hereunto set my hand.

JEHU JACOBS.

Witnesses:
S. H. NOURSE,
JESSIE C. BRODIE.